United States Patent
El-Charif et al.

(10) Patent No.: US 10,284,487 B2
(45) Date of Patent: May 7, 2019

(54) SOFTWARE LOAD BALANCER TO MAXIMIZE UTILIZATION

(71) Applicant: PayPal, Inc., San Jose, CA (US)

(72) Inventors: Rami El-Charif, San Jose, CA (US); Sathyamangalam Ramaswamy Venkatramanan, Cupertino, CA (US); Rema Hariharan, Austin, TX (US); Varna Puvvada, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 340 days.

(21) Appl. No.: 14/586,814

(22) Filed: Dec. 30, 2014

(65) Prior Publication Data

US 2015/0312166 A1    Oct. 29, 2015

Related U.S. Application Data

(60) Provisional application No. 61/984,603, filed on Apr. 25, 2014.

(51) Int. Cl.
*H04L 12/911* (2013.01)
*H04L 12/24* (2006.01)
*H04L 29/08* (2006.01)

(52) U.S. Cl.
CPC ........ *H04L 47/726* (2013.01); *H04L 41/5019* (2013.01); *H04L 67/1012* (2013.01); *H04L 67/1031* (2013.01)

(58) Field of Classification Search
CPC ............... H04L 47/726; H04L 67/1012; H04L 67/1038; H04L 45/00; H04L 67/2814; H04L 21/23103
See application file for complete search history.

(56) References Cited

U.S. PATENT DOCUMENTS

| | | | |
|---|---|---|---|
| 8,014,290 B2* | 9/2011 | Ji | H04L 45/00 370/227 |
| 2002/0116479 A1* | 8/2002 | Ishida | H04L 67/1008 709/220 |
| 2005/0022202 A1* | 1/2005 | Sannapa Reddy | G06F 9/505 718/105 |
| 2005/0114429 A1* | 5/2005 | Caccavale | G06F 9/505 709/200 |
| 2011/0004656 A1* | 1/2011 | Egashira | G06F 9/505 709/203 |

* cited by examiner

*Primary Examiner* — Esther B. Henderson
(74) *Attorney, Agent, or Firm* — Maschoff Brennan (57) ABSTRACT

A load balancer receives a sequence of requests for computing service and distributes the requests for computing service to a computing node in an ordered list of computing nodes until the computing node reaches its maximum allowable compute capability. Responsive to an indication that the computing node has reached its maximum allowable compute capability, the load balancer distributes subsequent requests for computing service to another computing node in the ordered list. If the computing node is the last computing node in the ordered list, the load balancer distributes a subsequent request for computing service to a computing node other than one of the computing nodes in the ordered list of computing nodes. If the computing node is not the last computing node in the ordered list, the load balancer distributes a subsequent request for computing service to another computing node in the ordered list of computing nodes.

19 Claims, 7 Drawing Sheets

SOFTWARE LOAD BALANCER TO MAXIMIZE UTILIZATION

CLAIM OF PRIORITY

This application claims the benefit of priority to U.S. Provisional Patent Application Ser. No. 61/984,603, filed on Apr. 25, 2014, which is incorporated by reference herein in its entirety.

TECHNICAL FIELD

The subject matter disclosed herein generally relates to the processing of data. Specifically, the present disclosure addresses systems and methods to facilitate load balancing in the use of resources.

BACKGROUND

Large scale computing systems process work by distributing the incoming work across a set of machines running similar software. What is desired is a load balancer which may be an efficient software load balancer that will distribute the work across a minimum set of machines and reduce overall cost of performing the given work at any given time.

BRIEF DESCRIPTION OF THE DRAWINGS

Some embodiments are illustrated by way of example and not limitation in the figures of the accompanying drawings.

DETAILED DESCRIPTION

Example methods and systems are directed to software load balancers. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Traditional load balancers use a given set of target machines to send the load to as evenly as possible among the members of the set. Different load balancing methods achieve this either by using a static load balancing method or by using information on the state of the target machines. But this type of load balancer is not necessarily distributing the work evenly. If there are slower machines, the load balancer might give less work to the slower machines and more work to the faster machines. However, this can result in problems because of the possibility of multiple machine technologies being in the same group. Stated another way, there can be slower machines and faster machines in the set and the system will automatically distribute the load based on the need of the jobs at hand and the speed of available machines in the set. This usually results in the work being balanced among the machines in a set, with some machines operating on a large number of jobs while other, perhaps slower, machines, operating on a smaller number of jobs. In all cases, the total number of machines operational will be the entire set. Consequently, both power and resources are used inefficiently. Stated another way, the traditional load balancer is static, much like an appliance. The load balancer statically operates without a degree of freedom that would allow it to listen to the detailed feedback of the system being balanced, and react accordingly. Consequently, the traditional load balancer does not discard unnecessary capacity nor does it add capacity as needed; it uses all machines in a pool at all times.

Example embodiments provide a load balancer which distributes work across each machine in a set of machines (which may be virtual machines) until each machine reaches its maximum allowable compute capability before distributing work to the next machine in the set, without impacting the user experience. This type of load balancer avoids the inefficiency problem caused by slower and faster machines in the set. For example, if the system comprises a set of ten machines, the number of machines needed to perform the work at hand at a given time might just be three. The load balancer distributes the work to each machine until that machine reaches its maximum, and then begins distributing work to the next machine, and so on. The result, in this example, would be that three machines would be used for the work. The other seven could be used for other system work or could be powered down as desired in order to conserve power. This is achieved by a dynamic software load balancer in which the usual service level agreement (SLA) determines an expected response time, and feedback from the machines determines, or enables the load balancer to determine, how many jobs are pushed to the minimum number of machines in the set of machines to do the work.

Every machine that is toad balanced in the set has local management software (sometimes called a management system) that is used to manage application software on that machine. When a new version of an application is deployed, the management system brings the local management software up and then starts a load balancer agent. The agent then communicates with the load balancer for registering itself as ready to receive traffic. The overall system also provides that a node, (e.g., machine) trying to register is valid and part of a pool that is authorized to receive work. After this, the node starts receiving work from the load balancer when it is needed. The load balancer will continue sending traffic to the node until it reaches saturation, at that point the load balancer does not send any new work until the node has finished with some of the work it already has. When there is not enough work to give to this node, it is released from the load balancer and can be reclaimed, or can remain idle until it is needed again. In practice the machines can function with or without the agent.

The load balancer will look at all the machines registered for a given function and will start traffic to those machines, using some order it determines randomly. As the load balancer sends traffic to a machine, it will receive feedback from that machine that tells the load balancer how much more work the machine can accept that can be completed within the specified SLA. The load balancer continues to send traffic to that machine until it is saturated. Once that occurs, the load balancer starts sending traffic to the next machine in the group and so on. When the incoming traffic starts slowing down, the machine with least work in progress is idled and potentially released if the load balancer does not have enough traffic to send.

An overall management control plan ay look at the entire system holistically and decide whether it needs to add more capacity to a given pool. The decision may be based on traffic patterns and system behavior. If the amount of work goes down below a threshold and a lot of machines become idle, the management control plan can reclaim these idle machines and use them for other work or simply turn them off to conserve power.

Figure 1:
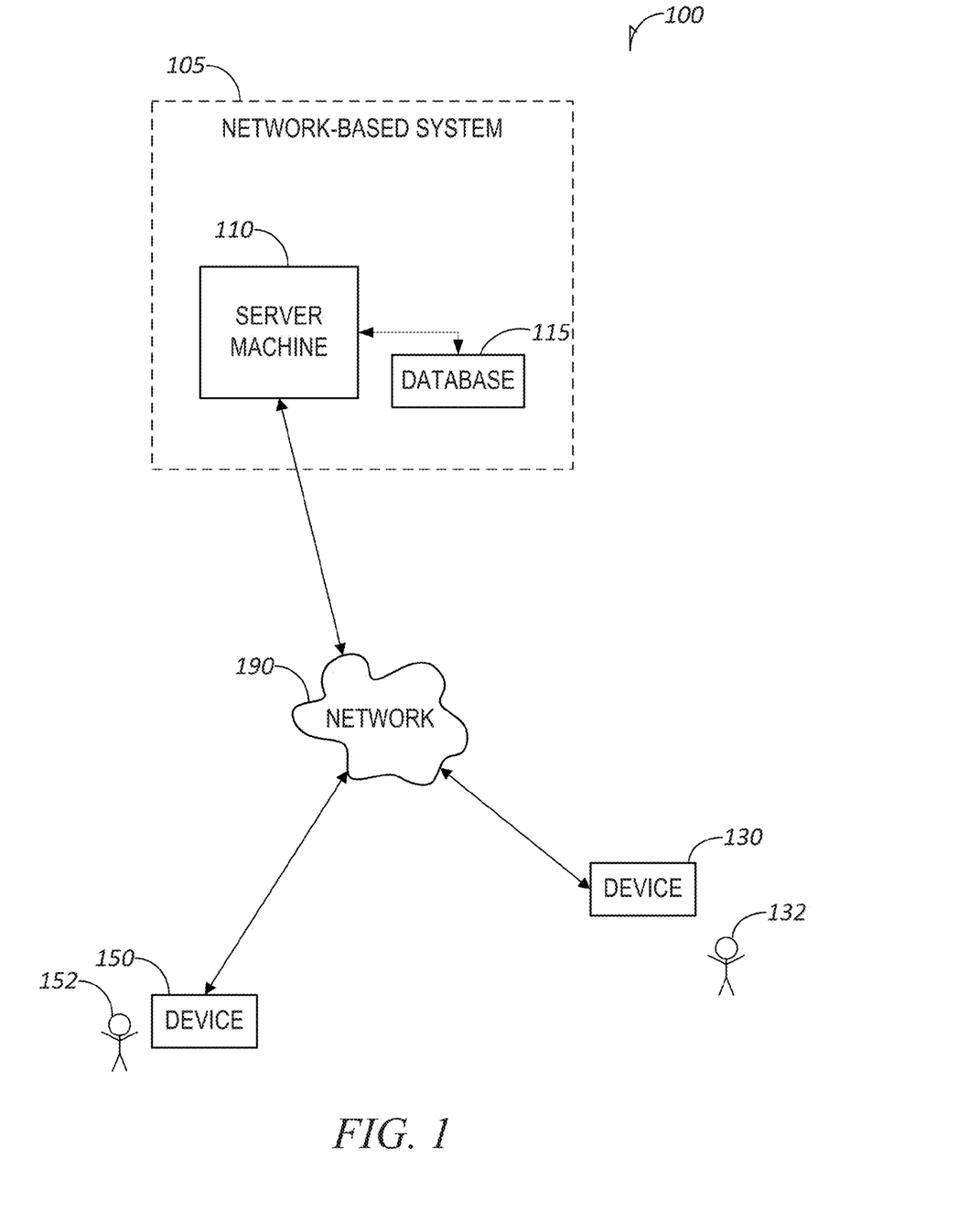
FIG. 1 is a network diagram illustrating a network environment suitable for performing data processing, according to some example embodiments.

FIG. 1 is a network diagram illustrating a network environment 100 suitable for software load balancers, according to some example embodiments. The network environment 100 includes a server machine 110, a database 115 connected to server machine 110, and devices 130 and 150, all communicatively coupled to each other via a network 190. The server machine 110 may form all or part of a network-based system 105 (e.g., a cloud-based server system configured to provide one or more services to the devices 130 and 150). The server machine 110 and the devices 130 and 150 may each be implemented in a computer system, in whole or in part, as described below with respect to FIG. 5.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 7. As used herein, a "database" is a data storage resource, which operates in accordance with storage module 230 and is accessed via access module 210, to store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
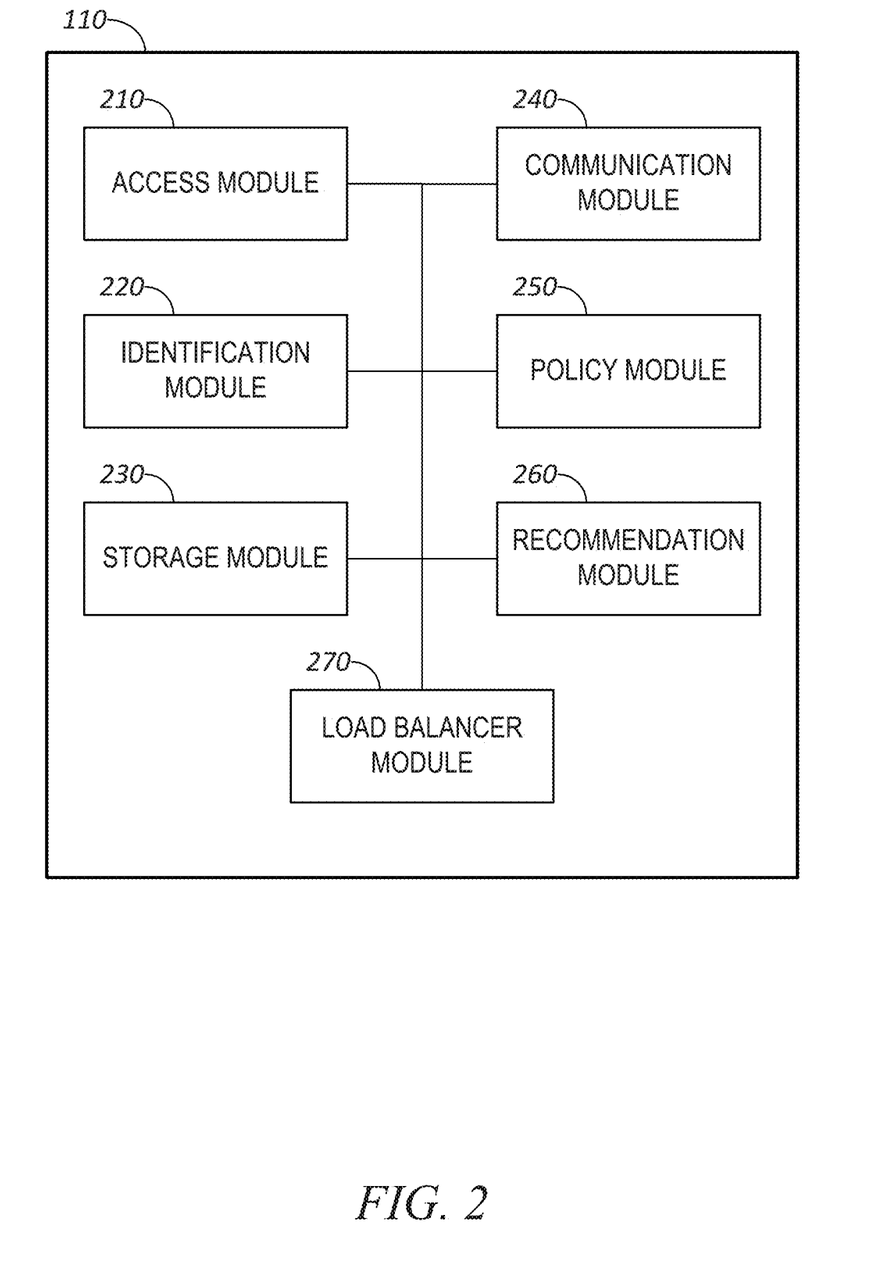
FIG. 2 is a block diagram illustrating components of a server machine suitable for work load balancing in a network environment, according to some example embodiments.

FIG. 2 is a block diagram illustrating components of the server machine 110, according to some example embodiments. The server machine 110 is shown as including access module 210, identification module 220, storage module 230, a communication module 240, policy module 250, recommendation module 260, and load balancer module 270, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In particular, the load balancer module 260 performs the data flow described with respect to the flowchart of FIG. 4. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
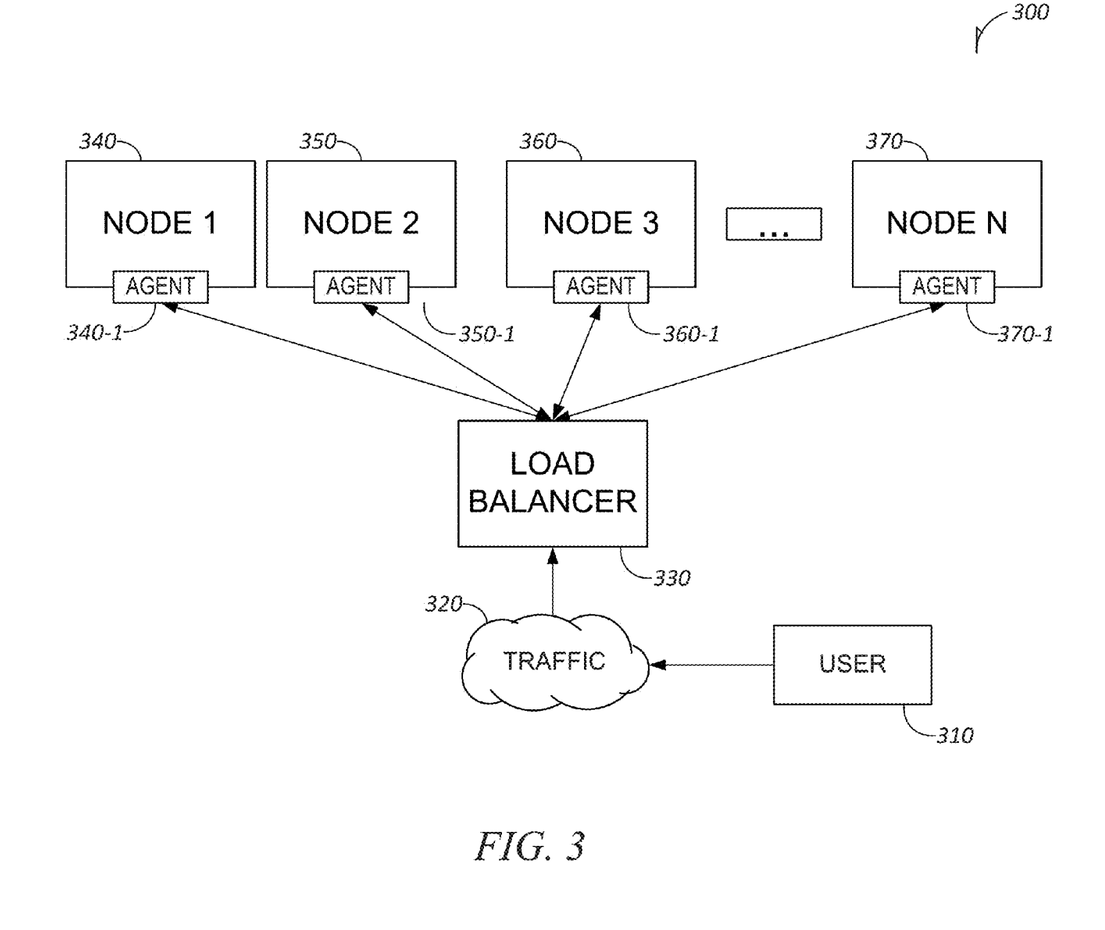
FIG. 3 is a block diagram illustrating components of a device suitable for a workload balancer, according to some example embodiments.

FIG. 3 is a block diagram illustrating components of a device suitable for a workload balancer, according to some example embodiments. As seen in FIG. 3, a system 300, which may be the network-based system 105 of FIG. 1, comprises a number of computer nodes 340, 350, 360, . . . , 370 each comprising a respective computer machine, and each respectively representing computer nodes which may be referred to as Node 1, Node 2, Node 3, ..., Node N of FIG. 3. Associated with each node is a load balancer agent such as 340-1, 350-1, 360-1, ..., 370-1 of nodes 340, 350, 360, ... 370. Load balancer 330, which in some embodiments is software such as load balancer module 270 of FIG. 2, interfaces with each node, in one embodiment, agents 340-1, 350-1, 360-1, ..., 370-1 in order to communicate with each node via communication module 240 of FIG. 2. As discussed briefly above, when a new version of an application is deployed, the management system 300 brings the new version of the application up and then starts a load balancer agent such as agents 340-1, 350-1, 360-1, ..., 370-1 of nodes 340, 350, 360, ..., 370, respectfully. The agent then communicates with the load balancer 330 via communication module 240 for registering itself as ready to receive traffic. The system 300 also provides, via identification module 220, that the node trying to register is valid and part of a pool that is authorized to receive work by, inter alia, checking node address, machine configuration, and application version numbers. Identification module 220 communicates with policy module 250 that addresses security risks by implementing additional authentication. The agent then communicates via communication module 240 of FIG. 2 with the load balancer 330 for registering itself as ready to receive traffic. As mentioned, the toad balancer 330 may operate with or without agents. Operation of the load balancer 330 is described in additional detail below. With continued reference to FIG. 3, user 310 communicates with system 300 over the network 320 (which may the same as network 190 of FIG. 1). When a user communicates with system 300, policy module 250 provides security by such actions as verifying that a requested certificate is for a specific user and for a specific purpose, and it can enforce whether to deploy a user certificate or computer certificate. The load balancer 330 interfaces with network 320 via a network interface of system 300.

Figure 4:
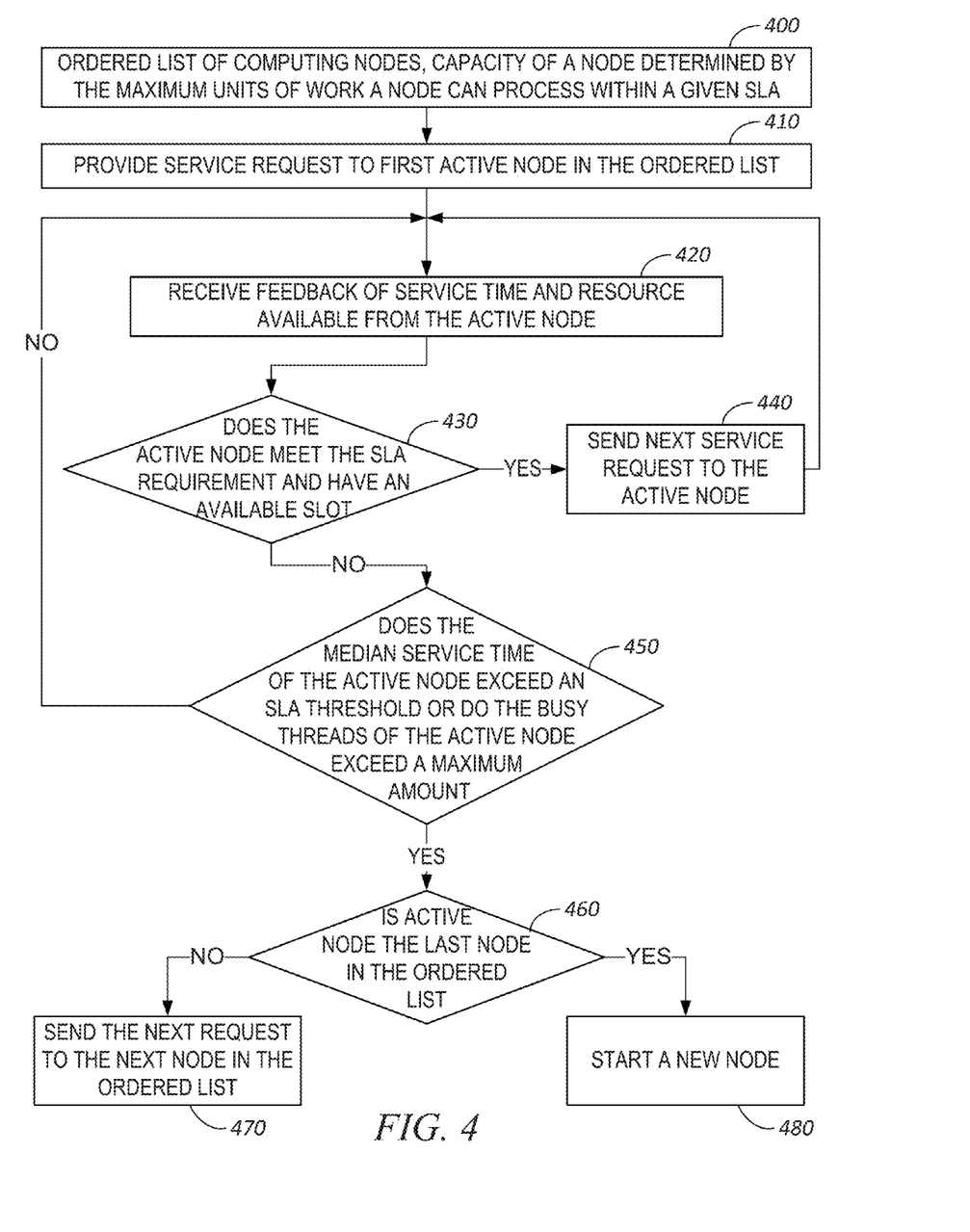
FIG. 4 is a flowchart illustrating data flows within the network environment suitable for load balancing, according to some example embodiments.

FIG. 4 is a flowchart illustrating data flows within the network environment suitable for load balancing, according to some example embodiments. The method of the flowchart of FIG. 4 begins with an ordered list of computing nodes such as nodes 340, 350, 360, ..., 370 of FIG. 3 that are configured for system processing in operation 400. As discussed above, the capacity of a given node may be determined by the maximum units of work that a node can process to be within the requirements of the SLA of the given node. Operations in the method 400 may be performed using modules described above with respect to FIG. 2 as more fully discussed below.

As shown in FIG. 4, the method 400 includes operations 400, 410, 420, 430, 440, 450, 460, and 470. As a service request arrives to the load balancer module 270 of FIG. 3, via communication module 240 of FIG. 2, from a user 310, load balancer module 270 of FIG. 2 provides the service request to the first node in the ordered list for processing at operation 440 of FIG. 4. The load balancer module 270 communicates with the nodes 340, 350, 360, ..., 370 by communication buses 340-2, 350-2, 360-2, ..., 370-2, respectively, via access module 210 of FIG. 2, and receives feedback of service and resource availability from the node that is active at operation 420.

Based on the feedback, certain decisions may be made. As seen at operation 430 a determination is made, by load balancer module 270 interacting with access module 210 to address the active node, as to whether the active node both meets the SLA requirement and has an available processing slot. If the answer is YES, (i.e., the YES decision is taken), then the load balancer module 270 sends the next service request to the currently active node at operation 440 via communication module 220 of FIG. 2. If the NO decision is taken at operation 430, then a test is performed at operation 450 by load balancer module 270 of FIG. 2 to determine whether the average service time of the active node exceeds an SLA threshold or whether busy threads of the active node exceed a maximum amount. The maximum amount may be determined by the system designer in accordance with the needs of the particular system.

If a NO decision is taken at operation 450, the system continues back to operation 420 to receive feedback from the active node for a number of times for either the YES decision to be taken at operation 450 or the YES decision to be taken at test operation 430, described below. The system designer may set a time-out period whereby if either the YES decision at operation 430 or the YES decision at operation 450 is not reached during the time-out period, load balance module 270 issues an alert indicting an abnormal condition is generated.

If the YES decision is taken at step 430, this indicates that the active node is operating with the desired SLA requirement and does have an available processing slot. Consequently as at operation 440, the load balancer module 270 sends the next service request to the active node.

If the YES decision is taken at test operation 450, the active node is not in condition to receive another service request and another node should be initiated. At test operation 460, a determination is made by load balancer module 270 as to whether the active node is the last node in the ordered list. If the NO decision is taken, then load balancer module 270 sends the next service request to the next node in the ordered list in operation 470. If the YES decision is taken, that means that all nodes in the ordered list are operating at maximum capacity, and a new node should be brought online and added to the ordered list in operation 480.

One or more of operations 400-450 may be performed as part (e.g., a precursor task, a subroutine, or a portion) of operation 460.

According to various example embodiments, one or more of the methodologies described herein may facilitate load balancing. Moreover, one or more of the methodologies described herein may facilitate registering computing nodes or applications for operation. Hence, one or more the methodologies described herein may facilitate load balancing, as well as registering computing nodes or applications for operation.

When these effects are considered in aggregate, one or more of the methodologies described herein may obviate a need for certain efforts or resources that otherwise would be involved in load balancing. Efforts expended by a user in load balancing may be reduced or made more efficient by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 5A:
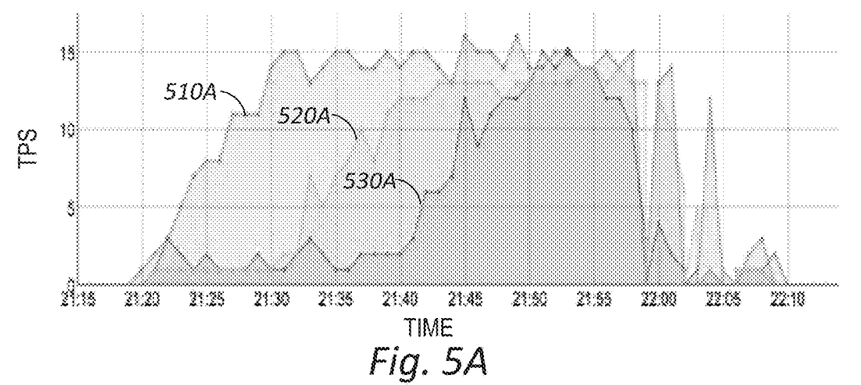
FIG. 5A is a graph illustrating how many transactions are being processed by each active machine, or node, of an ordered list of nodes, according to some embodiments.
Figure 5B:
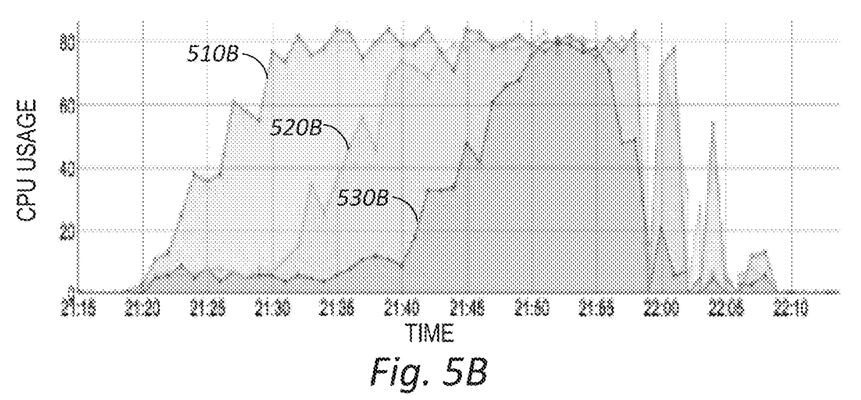
FIG. 5B is a graph illustrating a utilization level of the active machines or nodes, of an ordered list of nodes, according to some embodiments.
Figure 5C:
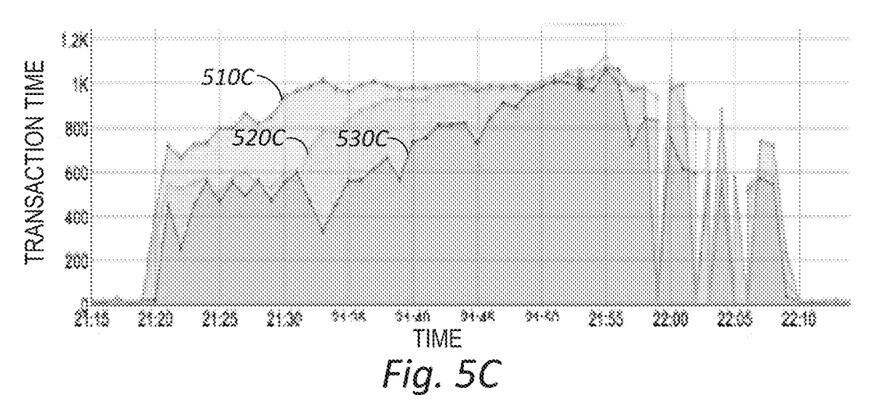
FIG. 5C is a graph illustrating the average response time of the transactions processed by active machines, or nodes, of an ordered list of nodes, according to some embodiments.
Figure 6:
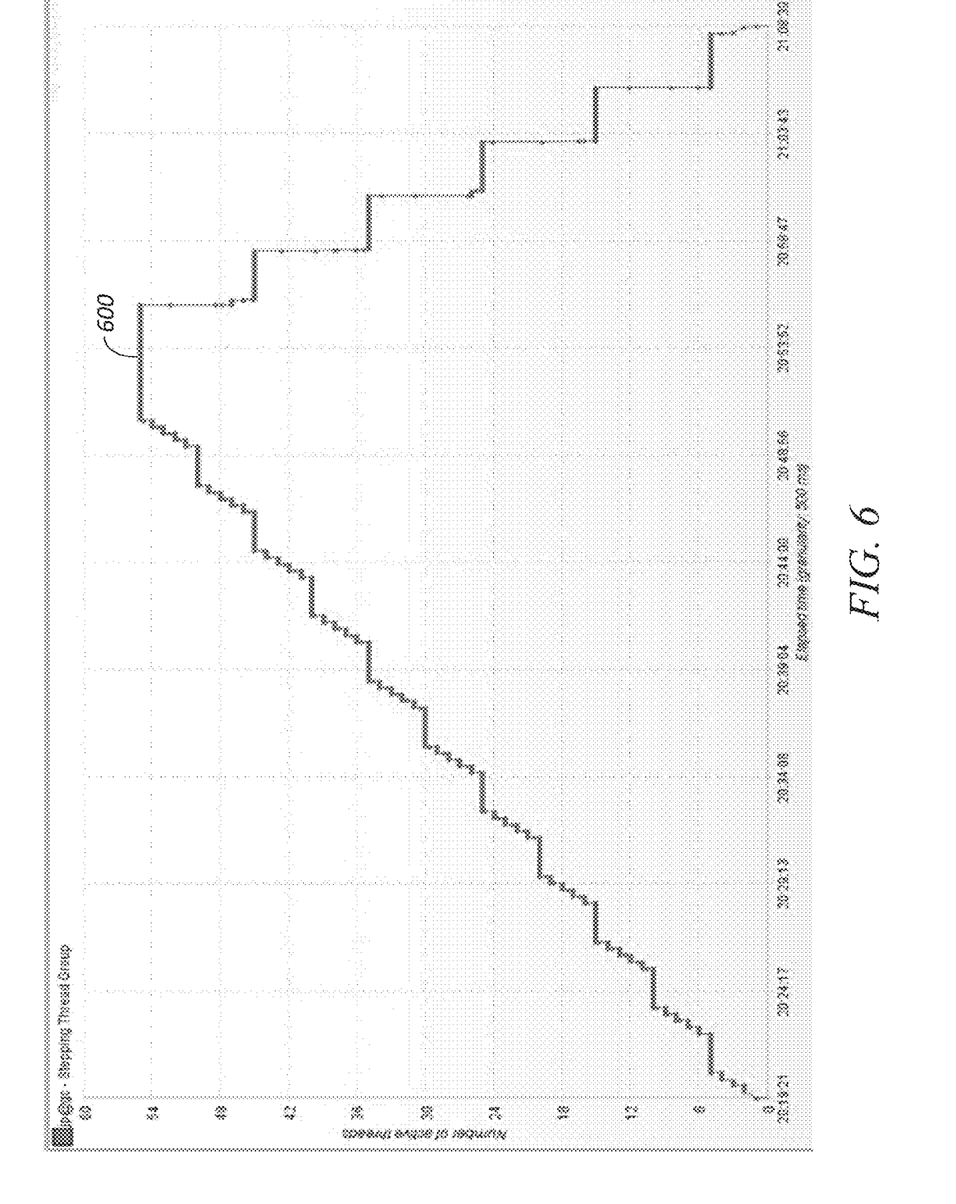
FIG. 6 is a graph illustrating steadily increasing, and then decreasing, transactions arriving for an ordered list of nodes, according to some embodiments.

FIG. 5A is a graph illustrating how many transactions are being processed by each active machine, or node, of an ordered list of nodes, according to some embodiments, at a given time, where the x-axis represents time. FIG. 5B is a graph illustrating a utilization level of the active machines or nodes, of an ordered list of nodes, according to some embodiments. FIG. 5C illustrates average response time of the transactions processed by a node. Each of the graphs of FIGS. 5A-5C represent a one minute perfmon. Each point on the graphs represents the corresponding value of the attribute averaged over one minute. FIG. 6 is a graph illustrating steadily increasing, and then decreasing, transactions arriving for an ordered list of nodes, according to some embodiments. As can be seen in FIG. 6, transactions 600 coming into this set of nodes will be steadily increasing and then begin decreasing at about 20 h53. The time stamps in FIG. 6 are in PST while those in the graphs of FIGS. 5A-5C are in MST.

As can be seen in FIG. 5A, a first machine 510A takes most of the transactions as illustrated by the rising plot of 510A in FIG. 5A, with corresponding rise in CPU utilization. This corresponding rise in CPU utilization is see as the rising plot 510B of FIG. 5B, until a little after 21 h30 when the response time begins to violate the given SLA, of 1 sec in the current example embodiment. At that point, the load balancer 330 of FIG. 3, which operates through load balancer module 270 of FIG. 2, starts giving the newly incoming transactions to the second node 520A of FIG. 5A and the first two nodes 510A and 520A get into dynamic equilibrium. At approximately 21 h40, as the second node 520A processes as many transactions as it can within the given SLA and starts violating the SLA for anything more, third node 530A is accessed to process any additional transactions. All three nodes 510A, 520A, and 530A are sharing the incoming transactions equally at approximately 21 h53 (20 h53 PST) when incoming load 600 starts falling as seen in FIG. 6. At that point, the last node brought in, 530A, is gradually let go, followed by the second node 520B, followed by the first node 510A. In other words, the nodes are brought in as and when needed and let go as and when not needed.

Figure 7:
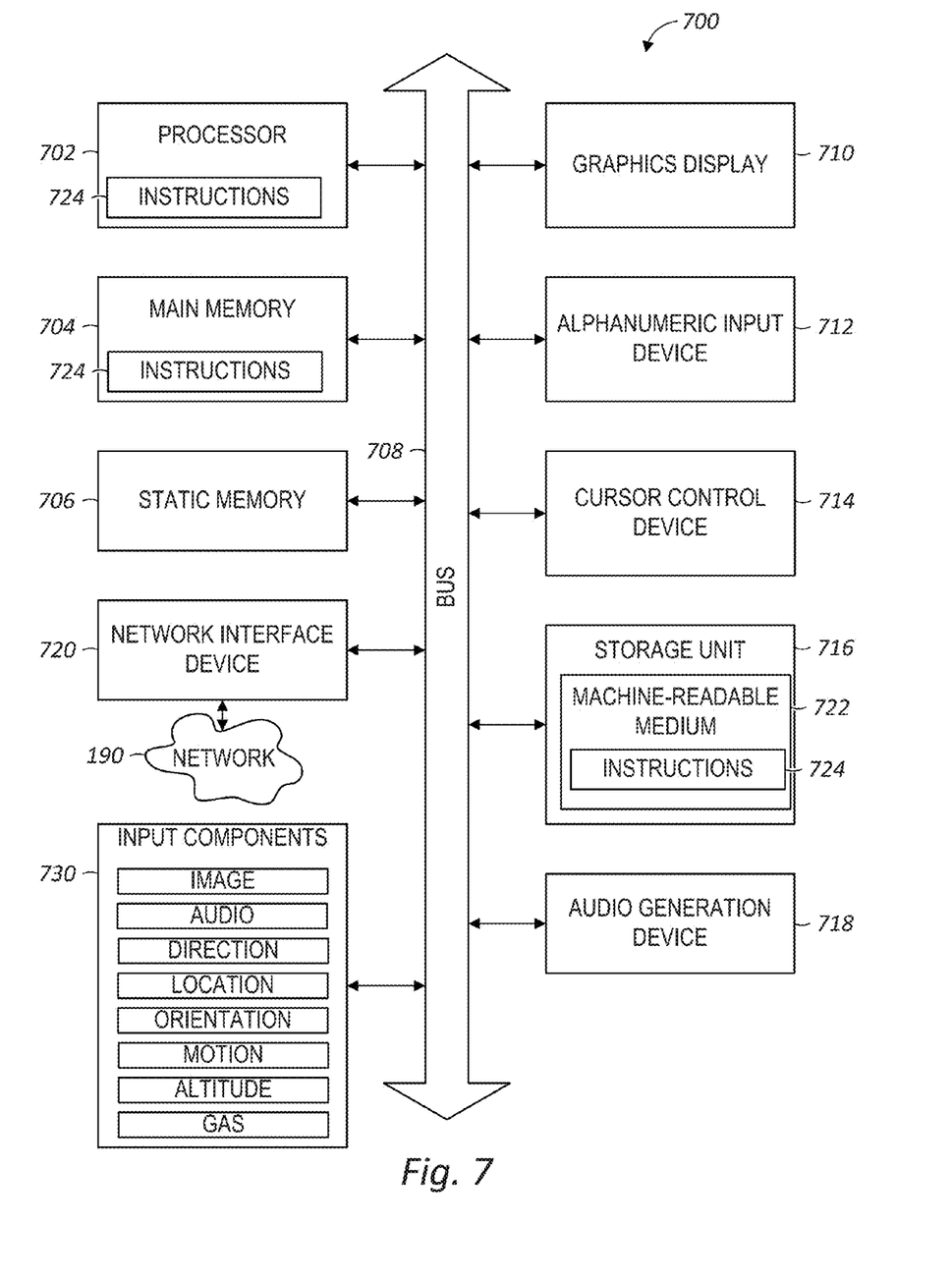
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, an audio generation device 718 (e.g., a sound card, an amplifier, a speaker, a headphone jack, or any suitable combination thereof), and a network interface device 720.

The storage unit 716 includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-readable media (e.g., tangible and non-transitory machine-readable media). The instructions 724 may be transmitted or received over the network 190 via the network interface device 720. For example, the network interface device 720 may communicate the instructions 724 using any one or more transfer protocols (e.g., hypertext transfer protocol (HTTP)). The machine may function with the Internet Protocol (IP) as a communications protocol in an Internet protocol suite for relaying datagrams across network boundaries. The routing function of the IP enables internetworking via the Internet. The Internet protocol suite has the task of delivering packets from the source host to the destination host based on the IP addresses in the packet headers. For this purpose, IP defines packet structures that encapsulate the data to be delivered. It also defines addressing methods that are used to label the datagram with source and destination information. The connection-oriented Transmission Control Protocol (TCP) may be used, often referred to as TCP/IP. The machine may operate with various versions of IP, including without limitation, Internet Protocol Version 4 (IPv4), Internet Protocol Version 6 (IPv6), and may be adapted for other and future protocols. The apparatus may function with various layers including an application layer, transport layer, Internet layer and link layer. Various transport layers may be used in addition to TCP. These transport layers may include User Datagram Protocol (UDP), Datagram Congestion Protocol (DCCP), Stream Control Transmission Protocol (SCTP), Resource Reservation Protocol (RSVP), and others. In operation, the request for compute service is initiated at a client machine by a user selecting a button, or selectable icon, for making the request at a user interface (UI) of the client machine. There is then a message exchange between the server and the client machine, the message exchange utilizing a network interface of the client machine and a network interface of the server.

In some example embodiments, the machine 700 may be a portable computing device, such as a smart phone or tablet computer, and have one or more additional input components 730 (e.g., sensors or gauges). Examples of such input components 730 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not he configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   one or more computer-readable storage media having stored thereon a set of instructions; and
   one or more hardware processors communicatively coupled to the one or more computer-readable storage media and configured to execute the set of instructions to cause the system to perform operations that include:
      receiving, in response to deployment of a new version of an application, a communication from a particular computing node to register the particular computing node as ready to receive requests for computing service;
      verifying, in response to receiving the communication, that the particular computing node is authorized to receive work related to requests for computing service by performing one or more authorization operations selected from a group of authorization operations consisting of: checking a node address of the particular computing node, checking a machine configuration of the particular computing node, and checking an application version number of the application on the particular computing node;
      receiving a sequence of requests for computing service, the sequence of requests to be performed by one or more computing nodes of an ordered list of computing nodes that includes the particular computing node, each computing node comprising a computing machine;
      responsive to receiving the sequence of requests for computing service, distributing individual ones of requests for computing service from the sequence of requests to the particular computing node in the ordered list of computing nodes without distributing other requests from the sequence of requests to other computing nodes until receiving an indication that the particular computing node has reached a maximum allowable compute capability; and
      responsive to the indication that the particular computing node has reached the maximum allowable compute capability, distributing to another computing node a subsequent request for computing service from the sequence of requests without distributing other requests from the sequence of requests to other computing nodes until receiving an indication that the another computing node has reached a maximum allowable compute capability.

2. The system of claim 1, wherein the operations further comprise:
   after distributing a first request to the particular computing node, receiving feedback information from the particular computing node that indicates that the particular computing node meets service level agreement (SLA) requirements and has an available computing slot; and
   responsive to the feedback information, distributing to the particular computing node a second request for computing service from the sequence of requests.

3. The system of claim 1, wherein the operations further comprise:
   after distributing one or more requests to the particular computing node, receiving feedback information from the particular computing node that indicates that service time of the particular computing node exceeds an SLA threshold or busy threads of the particular computing node exceed a maximum amount such that the feedback information indicates that the particular computing node has reached the maximum allowable compute capability; and responsive to receiving the feedback information, distributing to the another computing node the subsequent request for computing service.

4. The system of claim 1, wherein the operations further comprise: responsive to information that the particular computing node is a last computing node in the ordered list and responsive to receiving the indication that the particular computing node has reached a maximum allowable compute capability, distributing to a computing node other than one of the computing nodes in the ordered list of computing nodes the subsequent request for computing service, wherein the another computing node is the computing node other than one of the computing nodes in the ordered list.

5. The system of claim 1, wherein the operations further comprise: responsive to information that the particular computing node is not the last computing node in the ordered list and responsive to receiving the indication that the particular computing node has reached a maximum allowable compute capability, distributing to a next computing node in the ordered list of computing nodes the subsequent request for computing service, wherein the another computing node is the next computing node in the ordered list of computing nodes.

6. The system of claim 1, wherein requests for computing service are received from a client machine via a message exchange with the client machine, a message of the message exchange comprising information generated by selection of a selectable icon at a user interface at the client machine, the message exchange utilizing a network interface of the client machine.

7. A computer implemented method comprising:
receiving a communication from a particular computing node to register the particular computing node as ready to receive requests for computing service, the particular computing node included in an ordered list of computing nodes;
verifying, in response to receiving the communication, that the particular computing node is authorized to receive work related to requests for computing service by performing one or more authorization operations selected from a group of authorization operations consisting of: checking a node address of the particular computing node, checking a machine configuration of the particular computing node, and checking an application version number of an application running on the particular computing node;
receiving a sequence of requests for computing service;
responsive to receiving the sequence of requests for computing service, distributing a request from the sequence of requests for computing service to the particular computing node in the ordered list of computing nodes without distributing other requests from the sequence of requests to other computing nodes until receiving an indication that the particular computing node has reached a maximum allowable compute capability;
receiving, by a computer processor, feedback information that indicates that the particular computing node has reached the maximum allowable compute capability; and
responsive to receiving the feedback information, stopping distribution of requests from the sequence of requests to the particular computing node and distributing a subsequent request from the sequence of requests for computing service to another computing node.

8. The method of claim 7, the method further comprising:
after distributing the request to the particular computing node, receiving other feedback information that indicates that the particular computing node meets service level agreement (SLA) requirements and has an available computing slot; and
responsive to receiving the other feedback information, distributing to the particular computing node another request for computing service from the sequence of requests.

9. The method of claim 7, wherein the feedback information indicates that service time of the particular computing node exceeds an SLA threshold or busy threads of the particular computing node exceed a maximum amount such that the feedback information indicates that the particular computing node has reached the maximum allowable compute capability.

10. The method of claim 9, the method further comprising:
receiving information that the particular computing node is a last computing node in the ordered list; and
responsive to receiving the information that the particular computing node is a last computing node in the ordered list and responsive to receiving the feedback information, distributing to a computing node other than one of the computing nodes in the ordered list of computing nodes a subsequent request for computing service, wherein the another computing node is the computing node other than one of the computing nodes in the ordered list.

11. The method of claim 9, the method further comprising:
receiving information that the particular computing node is not a last computing node in the ordered list; and
responsive to receiving the information that the particular computing node is not a last computing node in the ordered list and responsive to receiving the feedback information, distributing to a next computing node in the ordered list of computing nodes a subsequent request for computing service wherein the another computing node is the next computing node in the ordered list of computing nodes.

12. The method of claim 7, the method further comprising: receiving requests for computing service from a client machine via a message exchange with the client machine, the request comprising information generated by selection of a selectable icon at a user interface at the client machine, the message exchange utilizing a network interface of the client machine.

13. A computer-readable hardware storage device having embedded therein a set of instructions which, in response to being executed by one or more processors of a computer, causes the computer to execute operations comprising:
receiving a communication from a first computing node to register the first computing node as ready to receive requests for computing service, the first computing node included in an ordered list of computing nodes;
verifying, in response to receiving the communication, that the first computing node is authorized to receive work related to requests for computing service by performing one or more authorization operations selected from a group of authorization operations consisting of: checking a node address of the first computing node, checking a machine configuration of the first computing node, and checking an application version number of an application running on the first computing node;

receiving a sequence of requests for computing service;

responsive to the sequence of requests for computing service, sequentially distributing one or more requests from the sequence of requests for computing service to the first computing node in the ordered list of computing nodes without distributing other requests from the sequence of requests to other computing nodes until receiving first feedback information that indicates that the first computing node has reached a first maximum allowable compute capability; and responsive to receiving the first feedback information, stopping distribution of requests from the sequence of requests to the first computing node and sequentially distributing one or more requests from the sequence of requests for computing service to a second computing node without distributing requests from the sequence of requests to other computing nodes until receiving second feedback information that indicates that the second computing node has reached a second maximum allowable compute capability.

14. The computer-readable hardware storage device of claim 13, the operations further comprising:

receiving other feedback information that indicates that the first computing node meets service level agreement (SLA) requirements and has an available computing slot; and responsive to receiving the other feedback information, continuing distributing to the first computing node one or more requests request for computing service from the sequence of requests.

15. The computer-readable hardware storage device of claim 13, wherein the first feedback information indicates that service time of the first computing node exceeds an SLA threshold or busy threads of the first computing node exceed a maximum amount such that the first feedback information indicates that the first computing node has reached the first maximum allowable compute capability.

16. The computer-readable hardware storage device of claim 15, the operations further comprising:

receiving information that the first computing node is a last computing node in the ordered list; and responsive to receiving the information that the computing node is a last computing node in the ordered list and responsive to receiving the first feedback information, distributing to a computing node other than one of the computing nodes in the ordered list of computing nodes a subsequent request for computing service, wherein the second computing node is the computing node other than one of the computing nodes in the ordered list.

17. The computer-readable hardware storage device of claim 15, the operations further comprising:

receiving information that the first computing node is not a last computing node in the ordered list; and responsive to receiving the information that the computing node is not a last computing node in the ordered list and responsive to receiving the first feedback information, distributing to a next computing node in the ordered list of computing nodes a subsequent request for computing service, wherein the second computing node is the next computing node in the ordered list of computing nodes.

18. The method of claim 7, wherein receiving the communication from the particular computing node to register the particular computing node as ready to receive requests for computing service is in response to deployment of a new version of an application on the particular computing node.

19. The computer-readable hardware storage device of claim 13, wherein receiving the communication from the first computing node to register the first computing node as ready to receive requests for computing service is in response to deployment of a new version of the application on the first computing node.

\* \* \* \* \*